(12) United States Patent
Oalen et al.

(10) Patent No.: US 8,688,351 B2
(45) Date of Patent: Apr. 1, 2014

(54) MODIFICATION OF ENGINE CONTROL SIGNAL TIMING BY EMULATION OF ENGINE POSITION SENSORS

(75) Inventors: Robert Oalen, Lancashire (GB); Hoi Ching Wong, San Diego, CA (US)

(73) Assignee: Clean Air Power, Inc., Poway, CA (US)

( * ) Notice: Subject to any disclaimer, the term of this patent is extended or adjusted under 35 U.S.C. 154(b) by 540 days.

(21) Appl. No.: 13/034,946

(22) Filed: Feb. 25, 2011

(65) Prior Publication Data
US 2011/0213545 A1    Sep. 1, 2011

Related U.S. Application Data

(60) Provisional application No. 61/308,358, filed on Feb. 26, 2010, provisional application No. 61/308,369, filed on Feb. 26, 2010.

(51) Int. Cl.
*F02D 41/02* (2006.01)
*F02D 41/28* (2006.01)
*F02D 41/00* (2006.01)
*F02D 41/40* (2006.01)

(52) U.S. Cl.
CPC .............. *F02D 41/02* (2013.01); *F02D 41/28* (2013.01); *F02D 41/0097* (2013.01); *F02D 41/401* (2013.01)
USPC ........... 701/102; 123/488; 123/612; 701/105; 701/115

(58) Field of Classification Search
CPC ............... F02D 41/401; F02D 41/402; F02D 2041/001; F02D 41/008; F02D 41/3011; F02D 41/3064; F02D 41/2429; F02D 41/2461; F02D 41/28; F02D 41/009; F02D 41/0097; F02D 41/02; F02D 41/0205; F02D 2041/0092; F02D 2041/0095
USPC ......... 123/478, 480, 488, 609, 612, 614, 494, 123/575; 701/102, 103, 105, 106, 110, 115; 73/114.26, 114.27
See application file for complete search history.

(56) References Cited

U.S. PATENT DOCUMENTS

| | | | | |
|---|---|---|---|---|
| 4,413,508 A | * | 11/1983 | Kawamura et al. | ........ 73/114.26 |
| 4,575,800 A | * | 3/1986 | Kittelson | ........ 701/105 |

(Continued)

FOREIGN PATENT DOCUMENTS

| | | |
|---|---|---|
| WO | 95/34755 | 12/1995 |
| WO | 2007/115594 A1 | 10/2007 |
| WO | 2008/104764 A1 | 9/2008 |

OTHER PUBLICATIONS

European Search Report Dated Jun. 6, 2011 for EP 11 15 6189.

*Primary Examiner* — Thomas Moulis
(74) *Attorney, Agent, or Firm* — Boyle Fredrickson, S.C.

(57) ABSTRACT

The timing of a controlled event is advanced or retarded in an IC engine by emulating the engine speed and position signal pattern prior to transmission of that signal pattern to an output such as a fuel injector. In a multi-controller engine in which a second controller is controlled at least in part by signals delivered by first controller, the signal preferably is emulated in the first controller prior to transmission to the second engine controller in order to allow the shifting of a timing of a controlled event without direct data transfer from the second controller to the first controller. The technique is particularly well-suited for controlling diesel fuel injection in a dual fuel or other multi-fuel engine. In this case, the first controller must be a dual fuel controller and the second controller may be a diesel controller.

17 Claims, 5 Drawing Sheets

(56) References Cited

U.S. PATENT DOCUMENTS

| | | | |
|---|---|---|---|
| 4,723,519 A * | 2/1988 | Ito et al. | 123/406.51 |
| 4,879,673 A * | 11/1989 | Nagase et al. | 702/100 |
| 4,911,123 A * | 3/1990 | Ellicott | 123/297 |
| 5,196,844 A * | 3/1993 | Tomisawa et al. | 340/870.29 |
| 5,219,398 A * | 6/1993 | Nonaka et al. | 123/406.58 |
| 5,233,961 A * | 8/1993 | Fukui et al. | 123/406.58 |
| 5,325,833 A * | 7/1994 | Fukui et al. | 123/406.18 |
| 5,499,534 A * | 3/1996 | Chan | 73/114.61 |
| 5,554,802 A * | 9/1996 | Fukui et al. | 73/114.27 |
| 5,623,412 A | 4/1997 | Masson et al. | |
| 5,628,294 A * | 5/1997 | Krieckaert et al. | 123/525 |
| 6,498,980 B1 | 12/2002 | Davis | |
| 6,502,550 B1 * | 1/2003 | Kotwicki et al. | 123/406.47 |
| 7,661,412 B2 * | 2/2010 | Kein et al. | 123/491 |
| 8,267,064 B2 * | 9/2012 | Martin et al. | 123/299 |
| 2007/0256482 A1 * | 11/2007 | Sheikh et al. | 73/116 |
| 2011/0088461 A1 * | 4/2011 | Howarth et al. | 73/114.45 |
| 2012/0191323 A1 * | 7/2012 | Warner et al. | 701/104 |
| 2012/0253641 A1 * | 10/2012 | Warner et al. | 701/104 |
| 2013/0073182 A1 * | 3/2013 | Lindsay et al. | 701/103 |

* cited by examiner

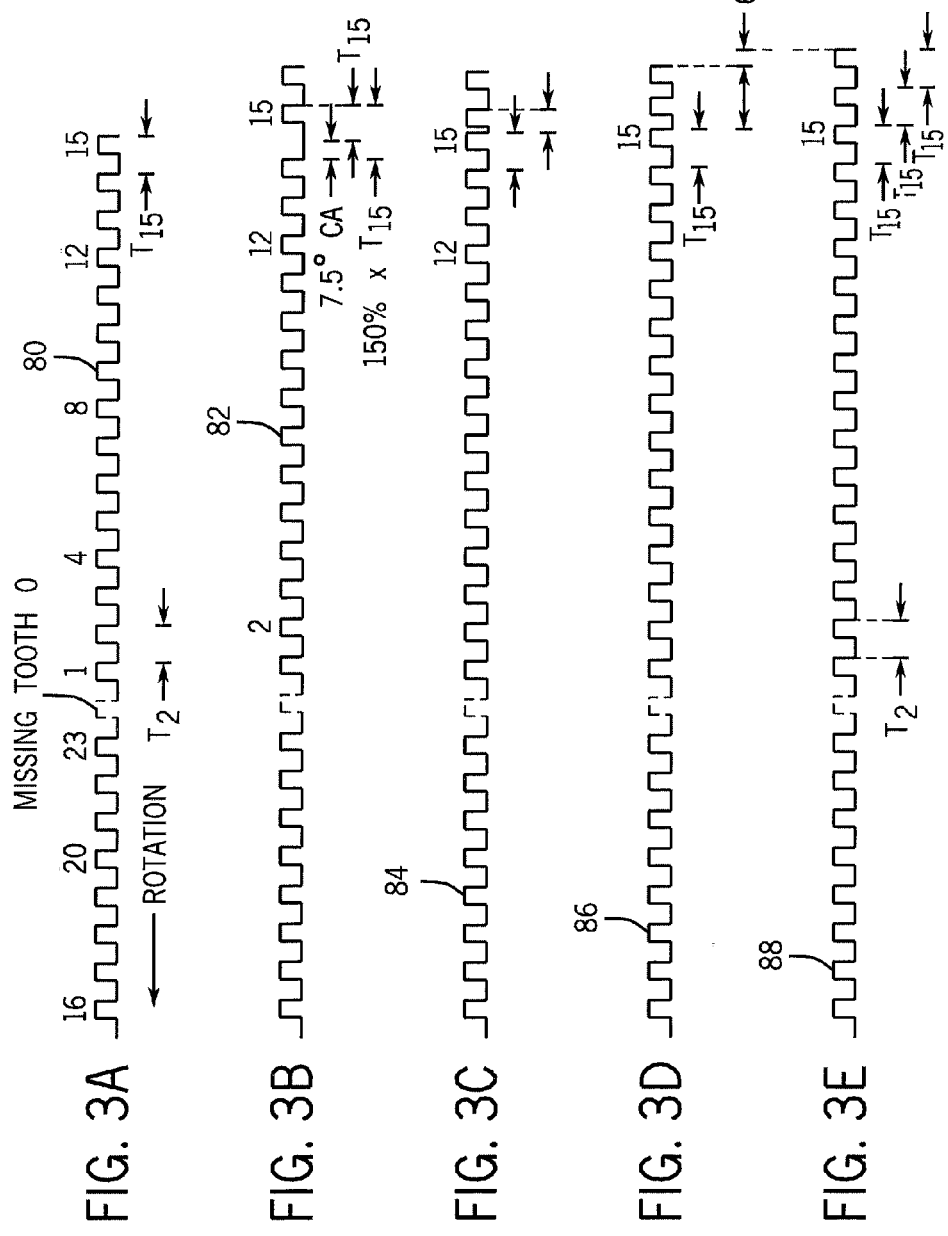

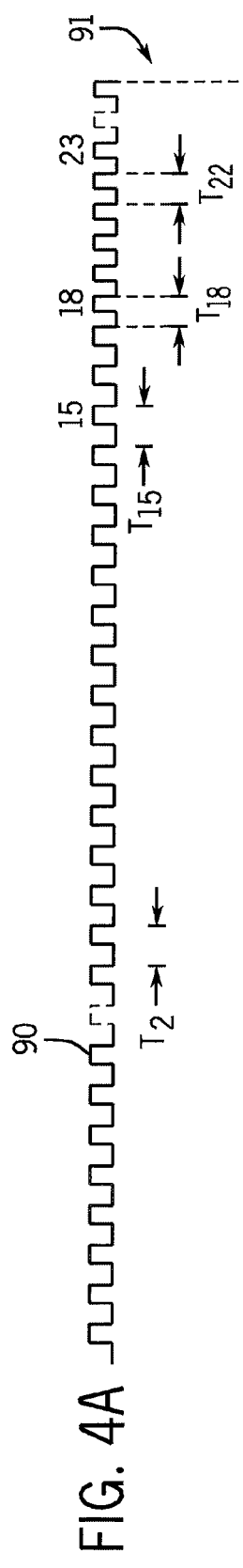
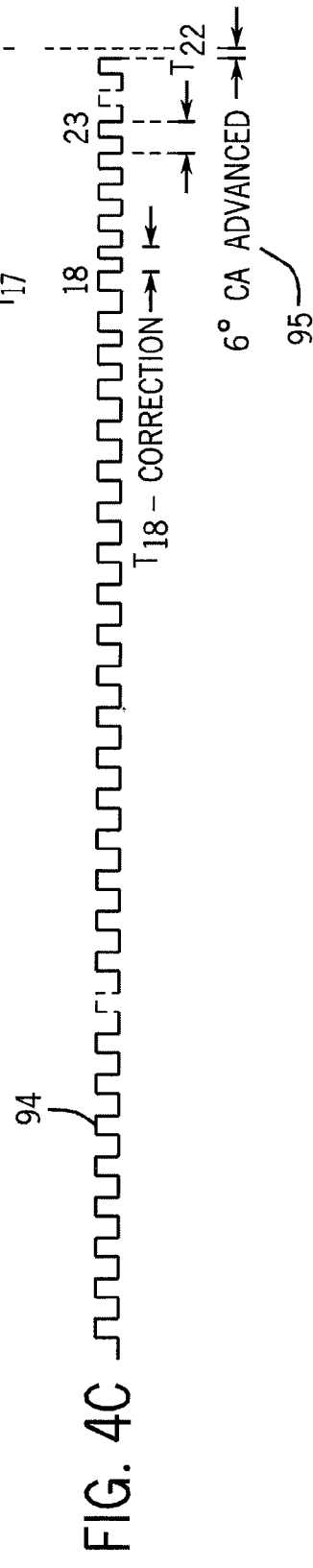
FIG. 4A
FIG. 4B
FIG. 4C

MODIFICATION OF ENGINE CONTROL SIGNAL TIMING BY EMULATION OF ENGINE POSITION SENSORS

CROSS REFERENCE TO RELATED APPLICATIONS

This application claims priority under 35 USC 119(e) from U.S. Provisional Patent Application Ser. Nos. 61/308,358 and 61/308,369, both filed on Feb. 26, 2010, the entire contents of each of which is hereby expressly incorporated by reference into the present application.

BACKGROUND OF THE INVENTION

1. Field of the Invention

The invention relates to internal combustion engines and, more particularly, relates to a method and apparatus for emulating engine speed and position signals used to control engine operation.

2. Description of Related Art

It is sometimes desired to advance or retard engine rotational position signals in an internal combustion (IC) engine in order to control engine operation such as, for example, advancing or retarding fuel injection timing compared to the injection timing that would otherwise be implemented under prevailing engine operating conditions. For example, in a "dual fuel" or other "multi-fuel" engine fueled under at least some operating conditions by a diesel pilot ignited natural fuel charge, it is desirable to advance or retard the diesel injection timing compared to that which would be desired for a diesel-only engine in order to obtain desired combustion characteristics. Typically, software is employed to read the position sensors and relay the input signal with an angle-based delay. This technique, though effective, can only be used to retard fuel injection. Other techniques are available for both advancing and retarding fuel injection, but they are limited in their ability to advance fuel injecting timing because they necessarily rely on real-time or near-real time encoder data for their controls. An example of such a system is disclosed in British Published Application No. 2,437,098, the subject matter of which is hereby incorporated by reference in its entirety.

The need therefore has arisen to provide a simple and effective technique of advancing or retarding a control signal in an IC engine.

SUMMARY OF THE INVENTION

The timing of a controlled event is advanced or retarded in an IC engine by emulating the engine speed and position signal pattern prior to transmission of that signal pattern to an output such as a fuel injector. In a multi-controller engine in which a second controller is controlled at least in part by signals delivered by a first controller, the signal preferably is emulated in the first controller, and the emulated signal rather than the received signal is transmitted to the second controller. This allows the shifting of a timing of a controlled event without data transfer from the second controller to the first controller and without the need for reliance on real-time data from the position sensor. The technique is particularly well-suited for controlling diesel fuel injection in a dual fuel engine. In this case, the first controller will be a dual fuel controller, and the second controller will be a diesel controller.

In a preferred embodiment, by using knowledge of the rotational pattern to be emulated, it is possible to gain positional synchronization with the engine. Knowledge of the position of missing or extra teeth on an encoder wheel is used most often. Once positional synchronization has been achieved, the required engine rotational pattern can be emulated and relayed in advance of the actual engine position. When applied to a dual fuel system, this technique allows the system to both advance and retard the diesel injection timing in relation to the actual rotational position of the engine.

Signal shifting of more than a designated magnitude preferably is controlled to be incremental rather than discrete so as to avoid system faults. In one embodiment, a Synthesized Buffering (SB) mode is introduced during every timing shift event so that the timing of the incremental shifts and the magnitude of each incremental shift are dependent on engine speed immediately prior to the timing shift. In addition to permitting larger shifts than otherwise could be accommodated, this technique avoids emulation inaccuracies that otherwise could result from changes in engine speed during the shifting period.

BRIEF DESCRIPTION OF THE DRAWINGS

Preferred exemplary embodiments of the invention are illustrated in the accompanying drawings in which like reference numerals represent like parts throughout, and in which:

FIGS. 3A-3E are timing diagrams illustrating a synthesized buffering technique for incrementally shifting engine position signals by large magnitudes;

FIGS. 4A-4C are timing diagrams illustrating a technique for taking engine speed changes into account when advancing or retarding an engine position signal pattern;

DETAILED DESCRIPTION OF THE PREFERRED EMBODIMENTS

In the preferred embodiments of the invention, the system operates in two modes and is implemented in a multi-controller system. However, it should be noted that the described functions conceivably could be integrated into a single controller. The first mode is a simple emulation mode in which the input pattern from the engine rotational sensor is received by a first controller and relayed replayed without modification directly to a second controller. Once the engine position has been determined using the known patterns, the system switches to the second mode, where the known pattern is replayed to the second controller from the first controller at the same speed as the input signal from the engine position sensor. Once the system is operating in this mode, the emulated pattern may be time shifted and relayed to the diesel controller in a pattern that is either advanced or retarded compared to the signal pattern from engine rotational sensor, which will in turn allow advance or retardation of a controlled event such as the diesel injection pulse to a dual fuel the engine.

Figure 1:
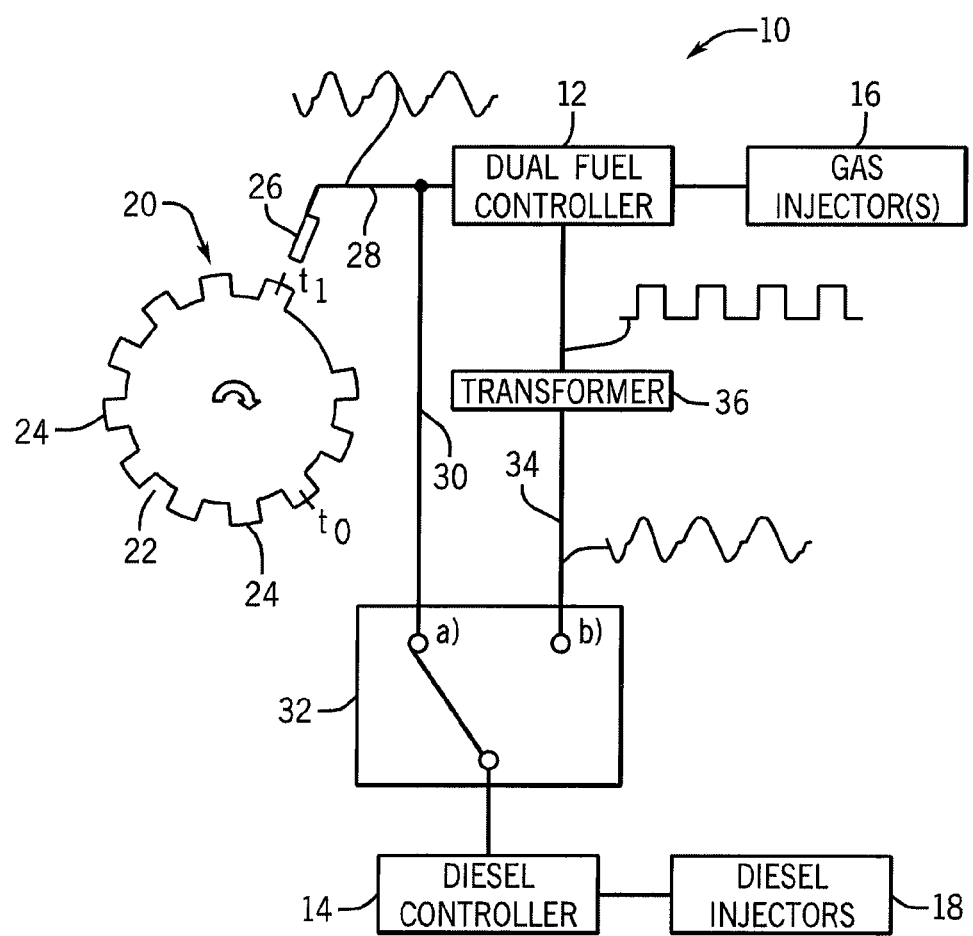
FIG. 1 as a schematic representation of a portion of a multi-fuel fuel engine capable of being controlled by preferred embodiments of the present invention.

Referring first to FIG. 1, the relevant portions of an engine 10 incorporating a preferred embodiment of the present invention are schematically illustrated. The engine 10 may, for example, be a so-called "dual fuel" engine or other multi-fuel engine capable of operating at least in a mode in which natural gas is ignited with the aid of a pilot charge of diesel fuel or another fuel that is ignitable by compression ignition. Most such engines also are selectively operable in a diesel-only mode in which they are fueled solely by diesel fuel or another liquid fuel capable of compression ignition. The gaseous fuel may be compressed natural gas (CNG) or liquefied natural gas (LNG). The natural gas may be supplied in a "single port mode" in which gas is supplied into an air intake manifold of the engine at a single location, or a "multi-port mode" in which the gas is supplied adjacent the inlet of each engine cylinder. The gas may also be supplied under pressure directly into the cylinder, as is the case in "high pressure direct injection" (HPDI) systems.

Still referring now to FIG. 1, all of the controlled components of the engine 10 are controlled via a control system that includes a first or dual fuel controller 12 and a second or diesel controller 14. The controllers 12 and 14 may be connected to one another directly or indirectly via one or more links. One such link (not shown in FIG. 1) may be a CAN link or other broadband communications link. The links also may include one or more conventional signal wires. Signal wires are shown in FIG. 1 by way of example, one of which indirectly couples the diesel controller 14 to the dual fuel controller 12 via an intervening switch 32, described below. The dual fuel controller 12 is configured, based on information received directly from various sensors, to control operation of the gaseous fuel supply system, including the supply of gaseous fuel to one or more gas injectors 16. The diesel controller 14 is configured, based on information received from sensors and possibly from the dual fuel controller 12, to control operation of the liquid fuel supply system, including the flow of diesel fuel to diesel fuel injectors 18. The controllers 12 and 14 also are preferably programmed so that the engine 10 can be operated in both a multi-fuel mode and a diesel-only mode. In this case, dual fuel controller 12 is configured to influence operation of the diesel controller 14 when the engine 10 is operating in the multi-fuel mode, and the diesel controller 14 is configured to control all aspects of engine operation when the engine 10 is operating in the diesel-only mode.

Both controllers 12 and 14 may comprise any of a variety of commercially available programmable systems, preferably a programmable electronic control unit (ECU). The dual fuel controller 12 is configured to influence operation of the diesel controller 14 by intercepting and modifying signals that otherwise would be bound for the diesel controller 14 so as to cause the diesel controller 14 to control the fuel injectors 18 to inject pilot fuel into the cylinders 12 at a timing and quantity that achieves the desired effect under prevailing speed and load conditions. This control need not be with feedback from the diesel controller 14 to the dual fuel controller 12. It instead is performed by intercepting signals bound for the diesel controller 14 and modifying those signals to effect pilot fuel injection for multi-fuel operation rather than diesel-only injection for diesel-only operation.

Engine position signals may be generated via any sensor capable of generating and transmitting engine position and speed data. A standard encoder-based sensor 20 will suffice. As is standard, the sensor 20 includes an encoder wheel 22 bearing a number of teeth 24 projecting from the perimeter of the wheel 22. The encoder wheel 22 may be mounted either on the engine's camshaft or its crankshaft, and some engines have encoder wheels mounted on both the camshaft and the crankshaft. The examples presented herein will assume that the encoder wheel is mounted on the crankshaft. The teeth 24 are arranged in a pattern that via which they are spaced equidistantly around the wheel 22 except for one or more discontinuities in the pattern, typically in the form of one or more extra teeth and/or one or more missing teeth. An optical or magnetic pick-up 26 detects the teeth 24 as they rotate past the pick-up 26 and transmits signals over a wire 28. These signals most typically are transmitted in the form of variable reluctance (VR) signals. Those signals may be transmitted directly to the diesel controller 14 via a signal wire 30 if a switch 32 in that wire is set to pass signals through to the controller 14 directly from the sensor 20. The switch 32 could be set for direct pass-through, for instance, at start-up, when operating in diesel only mode, or while operating in a "safe mode" if, for example, a fault is detected in the dual fuel controller 12. The signals from the sensor 20 also are received by the dual fuel controller 12 and emulated. During normal operation in which the switch 32 is set to pass signals from the dual fuel controller 12 rather than directly from the sensor 20, the emulated signals are transmitted to the diesel controller 14 via a signal wire 34 and a transformer 36, either without modification or with modification in a time-shifted manner.

More specifically, the dual fuel controller 12 receives a quasi-sinusoidal signal from the sensor 20, digitizes that signal, and outputs an engine position signal pattern that is produced from the received digitized signal pattern, but the signals of which may lead or lag the signals of the received pattern. The transformer 36 then partially inverts the emulated digital signal pattern and converts it to an analog signal pattern to produce a quasi-sinusoidal signal pattern. The transformer 36 may be an iron-core isolation transformer that provides full voltage isolation from the diesel controller ground. Such a transformer reduces electrical noise that otherwise would be introduced when controlling high input current outputs using the same system ground. The quasi-sinusoidal signal pattern output from the transformer 36 initially is the same as the signal pattern delivered to the dual fuel controller 12 until the dual fuel control understands both the pattern of the received signal and the rotational position of the engine 10.

Thereafter, the pattern output from the dual fuel controller can be emulated because the dual fuel controller 12 would have acquired sufficient data to generate digital signals producing a square waveform that predicts the location of each tooth being detected by the sensor 20, including the location of the "sync" tooth. This emulated engine position signal pattern can then be transmitted to the transformer 36 either without being modified or by being time-shifted relative to the input pattern. The modified or unmodified emulated engine position signal pattern is then transmitted to the diesel controller 14 via the transformer 36, which uses the received signals to control the diesel injectors 18. In generating emulated engine position signals that lead or lag the actual signals received from the sensor 20, the dual fuel controller 12 can "trick" the diesel controller 14 into initiating diesel injection earlier or later in an engine rotational cycle than it would based on its internal programming.

A technique for producing and transmitting a phase-offset emulated tooth pattern will now be described with reference to FIGS. 2A-2D.

Figure 2A:
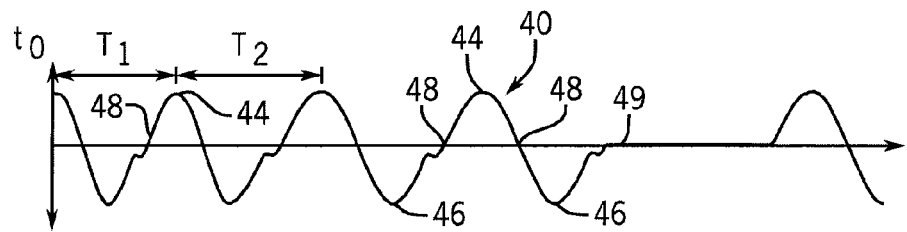
FIGS. 2A-2D are timing diagrams illustrating a first technique for altering the timing of engine position signals delivered to a liquid fuel controller of the engine of FIG. 1.

The curve 40 of FIG. 2A shows the input signals as delivered by the sensor 20 and received by the dual fuel controller 12. The signal pattern is quasi-sinusoidal in nature, having maxima 44, minima 46, and a zero crossing point 48 between each maximum and minimum. A given point on each quasi-sinusoidal period, such as a maximum, a minimum, or a zero-crossing, serves as a "marker" used by the controller 12 to detect the presence of a tooth. A zero crossing point is used as a marker in this example and indicates a leading or trailing edge of a tooth. By monitoring the time period between the detection of these markers over a statistically significant number of detection events, the controller is capable of detecting engine speed. By knowing which marker, and hence, which tooth, is being detected at any given time, the controller 12 is capable of detecting engine position and, thus, can emulate the received signal.

Figure 2B:
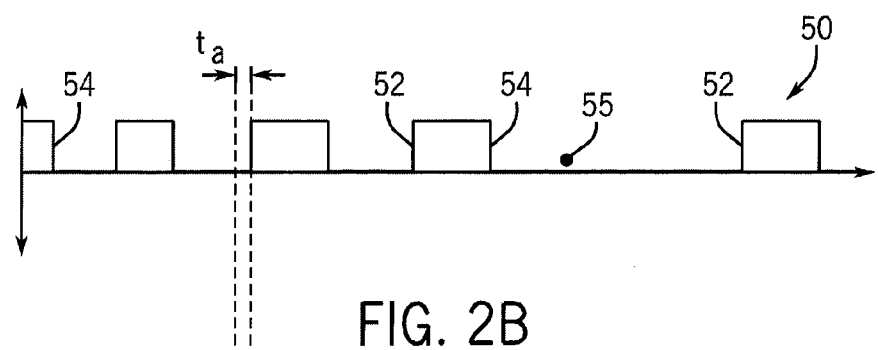
Figure 2C:
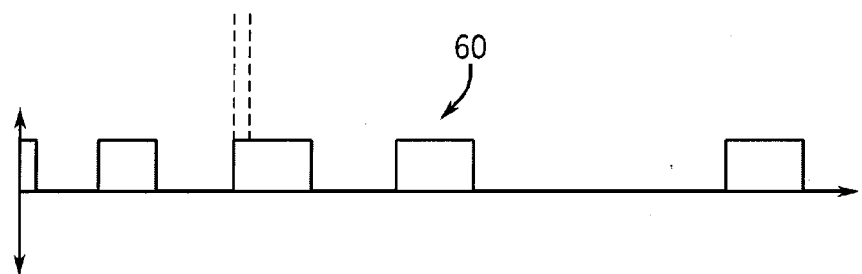
Figure 2D:
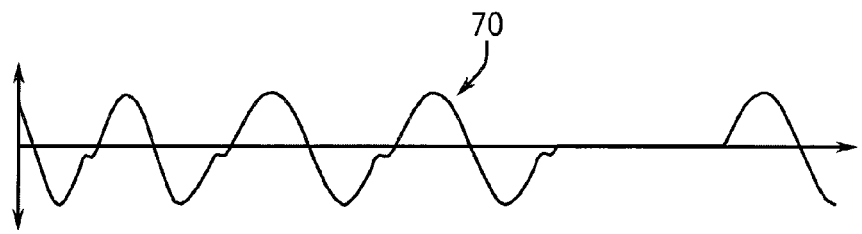

Specifically, a digitized waveform generated by marker detection is illustrated by the curve 50 in FIG. 2B. Specifically, a pulse is initiated and terminated with each successive marker detection event, resulting in the generation of a square waveform pattern in which the leading and trailing edges 52 and 54 of each pulse can be considered to represent the detection of the leading and trailing edges of an encoder wheel tooth 24. It should be noted at this time that all timing diagrams presume that processing delays inherent in any system are accounted for by suitable signal processing. Synchronization of the generated square waveform with the pattern on the encoder wheel is achieved at points 49 and 55 on FIGS. 2A and 2B, where an expected zero crossing is absent, resulting in the detection of a missing or "sync" tooth No. 0 on the encoder wheel 22. Armed with the knowledge of the location of the "sync" tooth and with the knowledge of the time between pulses, the controller 12 now has knowledge of both the speed and the position of the engine 10. The digitized signals received from the sensor 10 during this "learning period" are output to the transformer and then transmitted to the diesel controller 14.

Importantly for purposes of the present invention, the dual fuel controller 12 now has knowledge of an engine position signal pattern being generated by the encoder and can emulate that pattern. The emulated pattern can be relayed to the diesel controller 14 without modification. Alternatively, the emulated pattern can be modified prior to being output to the diesel controller, most typically in either a phase led or phase lagged time-shifted manner. A phase led emulated pattern is shown at curve 60 in FIG. 2C. The output pattern or modified emulated engine position signal is identical to the input pattern or sensed engine position signal pattern but is advanced relative to the input pattern by a designated amount $t_a$ of, e.g., 3 degrees. The phase-led or advanced pattern is then output to the transformer 32 of FIG. 1, where the digital signal having no zero crossing points is converted to an analog signal and partially inverted to produce a quasi-sinusoidal signal pattern illustrated by curve 70 in FIG. 2D. The pattern of curve 70 is identical to the pattern of the curve 40 of FIG. 2A but is advanced by the amount $t_a$.

The time-shifted emulated engine position signal pattern is then transmitted to the diesel controller 14 and used to initiate pilot fuel injection at a timing determined by its internal programming for existing engine operating conditions. Because the diesel controller 14 effectively has been "tricked" into believing that the engine 10 is at an earlier point in its operating cycle than it currently is, diesel timing injection is advanced.

The emulation relay technique described above also can be used by the dual fuel controller 12 to deliver a signal pattern to the diesel controller 14 that is either retarded or unchanged relative to the input signal pattern. It could also be used to effectively modify the input waveform in other ways instead of or in addition to being time-shifted relative to the input pattern, such as by indicating the presence of an additional missing tooth or another non-existing discontinuity in the actual tooth pattern.

While there is theoretically no effective limit on the magnitude of the timing shift or other change of the emulated signal pattern that is output from the dual fuel controller 12 when compared to the input pattern, fault detection measures incorporated into the diesel controller 14 impose limits on shifts that may be accepted by the diesel controller 14 without generating a fault signal. The maximum limit of timing advancement or retardation at any given point in the engine's operating cycle using this technique is effectively determined by the tooth spacing on the encoder wheel. The maximum limit for retarding a signal is the same as the spacing between crankshaft mounted encoder wheel teeth, or 6 deg. crank angle (CA) in a 60 tooth system or 15 deg. CA in a 24 tooth system. This limit will further be reduced due to the duty cycle of the tooth pattern, for an even tooth pattern, i.e., 50% duty cycle, the limit will be 3 deg. CA in a 60 tooth crankshaft mounted system, or 7.5 deg. CA in a 24 tooth system. An attempted phase shift of more than this limit would result in an erroneous detection of an extra missing tooth by the diesel controller and the generation of a resultant fault signal. In the event of the generation of a command to advance timing, the maximum limit of the shift will be that which is required to prevent "mismatch" or an erroneous detection of pulse overlapping and would depend on the duty-cycle of the square-wave-form signal. For example, for a system having 50% duty cycle, the maximum limit of timing advancement would be less than 3 deg. CA if the encoder wheel has 60 teeth and 7.5 deg. CA if the encoder wheel has 24 teeth.

It should be noted that the actual limits for time shifting can be reduced by abrupt changes in engine specs. The reason for this reduction can be appreciated from a comparison of curve 80 in FIG. 3A to the curve 82 in FIG. 3B. FIG. 3A illustrates a digitized waveform for a 24 tooth system as received by the sensor 20, i.e., before emulation. FIG. 3B illustrates the same waveform with an attempted 7.5 deg. CA retardation of the pulse emulating tooth No. 15 relative to the pulse emulating tooth No. 14, or with a 50% decrease alone in instantaneous engine speed during the emulation period preceding tooth No. 14. Any significant speed decrease, coupled with the pulse shifting intended to effect the desired 7.5 deg. CA retardation at the engine speed prevailing before the shift, will increase the effective lag between the emulated position of tooth No. 14 and the design position of emulated tooth No. 15 to beyond a point that the diesel controller 14 will determine that it has detected a missing tooth before the emulated leading edge of the pulse representing tooth 15 is detected.

An abrupt speed change, this time in the form of a large engine acceleration, also can reduce the limit of acceptable per-increment time advancement so that, in an engine having an encoder with a 50% duty cycle, the actual window for timing advancement may be significantly less than ½ the spacing between teeth. Curve 84 of FIG. 3C illustrates overlapping and resultant mis-match that could occur if one were to advance the position of tooth No. 16 by more than this limit relative to tooth No. 15. Each increment should be small enough to avoid such limits from being reached.

These potential fault detection events can be avoided by changing the output waveform incrementally rather than discretely and limiting the magnitude of phase lead or lag that is allowed at any given increment to be less than that which would be detected as a fault by the diesel controller.

A preferred technique for avoiding fault signal generation when commanding phase changes larger than those permitted by tooth spacing and changes in engine speed introduces a Synthesized Buffering (SB) mode during every timing shift event. The SB mode should be invoked for at least a 2-tooth period in order to permit an otherwise impermissibly large shift to be spread out over multiple periods. It preferably should be invoked over a period of at least half cylinder firing interval but not over such a large period that the shift takes significantly longer than necessary to implement. For a 60 tooth crankshaft mounted encoder wheel system used on a 6-cylinder, 4-stroke engine, the SB mode preferably should last for 60 deg. CA or a 10-tooth period. For the same engine having a 24 tooth encoder wheel system, the preferred SB mode would last a 4 tooth period. The system will synthesize the tooth period using the last-observed period. If the engine speed changes while operating in a timing advanced state, the synthesization preferably should be adjusted to accommodate that speed change.

More specifically, in accordance with this technique, three steps are performed during any timing shift event after the input pattern has been synched in the dual fuel controller and is capable of being emulated.

First, the input engine position signal is duplicated as a digital output signal in the first or dual fuel controller 12 and relayed to the diesel controller 14 as an emulated engine position signal without a timing shift.

The SB mode is initiated whenever a timing shift is commanded. The system synthesizes the output emulated engine position signal using the latest detected tooth period (PIP). It will be assumed that the system is a 24 tooth crankshaft mounted system in which the SB mode duration is selected to be 30 deg. CA, i.e., 2-tooth period. If the system commands a timing shift advancement of 6 deg. CA, the crank angle window available for the timing shift over a 2-tooth period will be 24 degrees. The system will predict or synthesize 2 tooth periods (pips) using the prevailing speed at the time the system enters the buffering mode to determine emulated tooth spacing required to evenly distribute the tooth position within the 24 deg. CA window while achieving the desired 6 deg. CA offset. This procedure is illustrated schematically by the curves 86 and 88 of FIGS. 3D and 3E in which the positions of the next two teeth nos. 16 and 17 are synthesized to achieve a 6 degree advancement following the passage of tooth No. 15, each emulated or synthesized tooth position is advanced by 3 degree.

When the SB mode ends, the dual fuel controller 12 will emulate the input signal and relay the emulated signal to the diesel controller 14 as a time shifted modified engine position signal. The engine speed will then be updated as necessary. The period of the very first tooth after the SB mode (tooth No. 18 in the above example) may need to be corrected to accommodate any change in detected engine speed change.

Figure 5A:
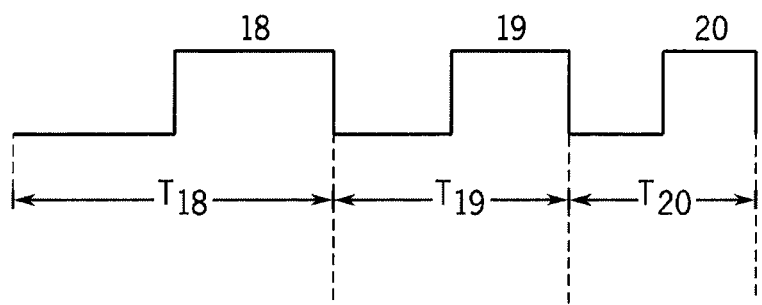
FIGS. 5A and 5B are enlarged portions of parts of the timing diagrams of FIGS. 4B and 4C.
Figure 5B:
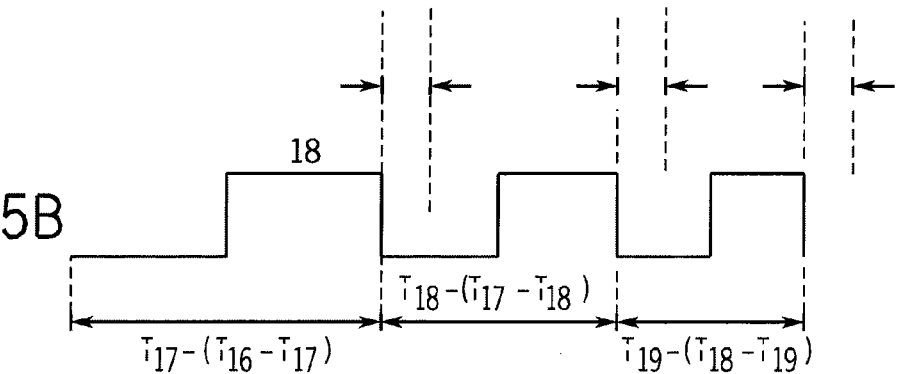

The difference in any consecutive tooth periods, i.e., $T_{i-1} - T_i$, preferably is recorded in the dual fuel controller's memory. In the event that timing is advanced during a change in engine speed, the system will correct the tooth period of the synthesized tooth in order to maintain the same timing advancement, i.e., $T_i(T_{i-1}-T_i)$. as shown by the curves in FIGS. 4A-4C. The curve 90 of FIG. 4A shows the waveform of the converted input signal in which a speed change starts at tooth No. 18, prior to any phase shifting. The curve 92 of FIG. 4B shows the same curve, modified or emulated to include a 6 deg. CA advancement using the SB duration of 2-tooth period (30 deg. CA) described above. A comparison of the point 91 on the curve 90 representing the trailing edge of tooth No. 1 to the corresponding point 93 on curve 92 of FIG. 4B reveals that the actual timing advancement is less than 6 deg. CA due to a lagging of the actual tooth period as a result of engine acceleration during part of the previous cycle. This lagging period is reflected by the fact that T17>T18. This difference can be corrected by recording the difference (T17–T18) and subtracting that difference from T18 at point 95 in curve 94 of FIG. 4C, thus achieving the desired 6 deg. CA offset at the end of the process. The correction is illustrated in greater detail by the curves in FIGS. 5A and 5B, which correspond to the curves 92 and 94 of FIGS. 4B and 4C, respectively, and which show the portion of the waveforms extending from the trailing edge of tooth No. 17 to the trailing edge of tooth No. 20.

To the extent that they might not be apparent from the above, the scope of still other variations falling within the scope of the present invention will become apparent from the appended claims.

We claim:

1. A method of advancing or retarding an engine position signal in an IC engine comprising:
   using at least one controller,
   determining an engine position signal pattern using engine position signals received from an engine position sensor, the determined pattern including at least one discontinuity and being sufficiently developed to determine engine speed and position, then
   emulating the engine position signal pattern, including the discontinuity, in a time-shifted manner, and
   controlling an engine component based at least in part on the emulated engine position signal pattern.

2. The method of claim 1, wherein the determining and emulating steps are performed in a first controller, and further comprising
   forwarding the emulated engine position pattern to a second controller, and
   using the second controller, controlling the engine component based at least in part on the emulated engine position signal pattern received from the first controller.

3. The method of claim 2, wherein the output is a fuel injector of an IC engine.

4. The method of claim 3, wherein the engine is a multi-fuel engine, the first controller is a dual fuel controller, the second controller is a diesel controller, and the output is a liquid fuel injector.

5. The method of claim 2, wherein the emulated engine position signal pattern is a square waveform pattern lacking zero crossings, and further comprising modifying the emulated engine position signal pattern before transmitting the emulated engine position signal pattern to the second controller and wherein the modified emulated engine position signal pattern comprising an at least quasi-sinusoidal pattern having zero crossings.

6. The method of claim 1, wherein the determining step comprises determining the location and spacing of a plurality of markers in the signal pattern and determining the location of the at least one discontinuity in the signal pattern.

7. The method of claim 6, wherein the discontinuity is generated by at least one of a missing tooth or an extra tooth on an encoder wheel tooth pattern of the engine position sensor.

8. The method of claim 1, wherein the emulated signal pattern is time advanced relative to the detected signal pattern.

9. The method of claim 8, wherein, as a result of the emulating step, timing is shifted in a Synthesized Buffering (SB) mode invoked for at least a 2-signal period.

10. The method of claim 9, wherein the time shifting occurs over a plurality of incremental advancements, each of which represents an incremental angular spacing that is less than the distance between encoder teeth on an encoder wheel of the engine position sensor.

11. The method of claim 10, wherein the incremental advancements take place in a plurality of successive signals within the engine position signal pattern, the spacing of the signals being dependent on the magnitude of the desired advancement and on the number of signals that can fit in an angular window of a designated magnitude.

12. The method of claim 9, further comprising adjusting the signal pattern to account for an engine speed change in a time period immediately preceding the advancement.

13. The method of claim 9, wherein the SB mode is invoked for at least half a cylinder firing cycle.

14. A method of advancing or retarding an engine position signal in an IC engine comprising:
    transmitting engine position signals from an encoder wheel-based engine position sensor to a first controller, the encoder wheel having a plurality of evenly-spaced markers having at least one discontinuity therein;
    using the first controller, determining an engine position signal pattern based on the signals received from the engine position sensor, the determined pattern being sufficiently developed to determine engine speed and position; then
    using the first controller, emulating the determined engine position signal pattern in a time-shifted manner to produce an emulated engine position signal pattern,
    transmitting the emulated engine position signal pattern to a second controller; and
    using the second controller, controlling at least one liquid fuel injector based at least in part on the emulated engine position signal pattern.

15. The method of claim 14, wherein the emulated engine position signal pattern is a square waveform pattern lacking zero crossings, and further comprising transforming the emulated engine position signal pattern into a modified engine position signal pattern that comprises an at least quasi sinusoidal pattern having zero crossings, wherein the second controller controls the liquid fuel injector based on the modified emulated engine position signal pattern.

16. A multi-fuel engine comprising:
    (A) at least one gaseous fuel supply device;
    (B) at least one liquid fuel injector;
    (C) an engine position sensor;
    (D) a dual fuel controller coupled to the gaseous fuel device and to the gaseous fuel injector, wherein the dual fuel controller receives engine position signals from the engine position sensor, determines an engine position signal pattern that has at least one discontinuity and that is sufficiently developed to determine engine speed and position, and generates an emulated engine position signal pattern that is time-shifted relative to the determined engine position signal pattern; and
    (E) a liquid fuel controller coupled to the dual fuel controller and to the liquid fuel injector, wherein the liquid fuel controller receives the emulated engine position signal pattern from the dual fuel controller and controls the liquid fuel injector based at least in part on the emulated engine signal position pattern.

17. The engine as recited in claim 16, wherein the emulated engine position signal pattern is a square-wave pattern lacking zero crossings, and further comprising a transformer that receives the emulated engine position signal pattern from the dual fuel controller, that modifies the emulated engine position signal pattern to an at least quasi-sinusoidal pattern having zero crossings, and that transmits the modified engine signal position pattern to the liquid fuel controller.

\* \* \* \* \*

UNITED STATES PATENT AND TRADEMARK OFFICE
CERTIFICATE OF CORRECTION

PATENT NO.        : 8,688,351 B2                                         Page 1 of 1
APPLICATION NO.   : 13/034946
DATED             : April 1, 2014
INVENTOR(S)       : Oaten et al.

It is certified that error appears in the above-identified patent and that said Letters Patent is hereby corrected as shown below:

TITLE PAGE,
  item (12)                    Replace "Oalen et al." with "Oaten et al."

item (75) Inventors:         Replace "Oalen" with "Oaten"

Signed and Sealed this
Tenth Day of June, 2014

Michelle K. Lee
*Deputy Director of the United States Patent and Trademark Office*